US009408235B2

(12) United States Patent
Kim et al.

(10) Patent No.: US 9,408,235 B2
(45) Date of Patent: Aug. 2, 2016

(54) METHOD FOR TRANSMITTING DATA BY USING IMPLICIT FORWARD ORDERING INFORMATION OBTAINED THROUGH COMPETITION BY MEANS OF DISTRIBUTED COORDINATION FUNCTION IN WIRELESS LAN, AND WIRELESS COMMUNICATION DEVICE FOR TRANSMITTING DATA BY USING THE SAME (71) Applicant: POSTECH ACADEMY-INDUSTRY FOUNDATION, Pohang-si, Gyeongsangbuk-do (KR)

(72) Inventors: Chee Ha Kim, Pohang-si (KR); Hyeon Mok Ko, Pohang-si (KR)

(73) Assignee: POSTECH ACADEMY-INDUSTRY FOUNDATION, Pohang-Si, Gyeongsangbuk-Do (KR)

( * ) Notice: Subject to any disclaimer, the term of this patent is extended or adjusted under 35 U.S.C. 154(b) by 8 days.

(21) Appl. No.: 14/417,599

(22) PCT Filed: Jun. 26, 2013

(86) PCT No.: PCT/KR2013/005642
§ 371 (c)(1),
(2) Date: Jan. 27, 2015

(87) PCT Pub. No.: WO2014/017745
PCT Pub. Date: Jan. 30, 2014

(65) Prior Publication Data
US 2015/0223269 A1  Aug. 6, 2015

(30) Foreign Application Priority Data

Jul. 27, 2012  (KR) ........................ 10-2012-0082557
Oct. 29, 2012  (KR) ........................ 10-2012-0120473

(51) Int. Cl.
G08C 17/00  (2006.01)
H04W 4/00  (2009.01)
(Continued)

(52) U.S. Cl.
CPC .......... H04W 74/0816 (2013.01); H04W 84/12 (2013.01)

(58) Field of Classification Search
CPC . H04L 12/4013; H04L 47/10; H04L 41/5019; H04W 56/00; H04W 74/02; H04W 52/46; H04W 74/0808; H04W 74/06
See application file for complete search history.

(56) References Cited

U.S. PATENT DOCUMENTS

2002/0071448 A1   6/2002  Cervello et al.
2002/0154653 A1*  10/2002  Benveniste ......... H04L 12/4013
                                              370/447

(Continued)

FOREIGN PATENT DOCUMENTS

KR  10-2004-0106920  12/2004
KR  10-2007-0101018  10/2007
KR    10-1162709     7/2012

OTHER PUBLICATIONS

International Search Report for International Application No. PCT/KR2013/005642, dated Oct. 28, 2013.

Primary Examiner — Melanie Jagannathan
(74) Attorney, Agent, or Firm — Kile Park Reed & Houtteman PLLC (57) ABSTRACT According to the present invention, back-off slots and collisions in a competition by means of a DCF can be significantly reduced, and a throughput higher than existing DCFs can be provided. Also, overhead due to additional control messages is eliminated by reverse order implied information operating in a distributed manner in terminals, and communication with existing terminals is enabled even in a wireless network using Aps or the DCF.

13 Claims, 4 Drawing Sheets (51) Int. Cl.
*H04J 3/16* (2006.01)
*H04W 74/08* (2009.01)
*H04W 84/12* (2009.01)

(56) References Cited

U.S. PATENT DOCUMENTS

2002/0163933 A1* 11/2002 Benveniste ............. H04L 47/10 370/465
2003/0012166 A1* 1/2003 Benveniste ........... H04W 56/00 370/338
2003/0086437 A1* 5/2003 Benveniste ............. H04L 47/10 370/461
2003/0174690 A1* 9/2003 Benveniste ........... H04W 74/02 370/350
2005/0058151 A1* 3/2005 Yeh ........................ H04W 52/46 370/445
2012/0224484 A1* 9/2012 Babiarz ............... H04L 41/5019 370/235
2013/0051335 A1* 2/2013 Adachi ............. H04W 74/0808 370/329
2015/0009879 A1* 1/2015 Kim ..................... H04W 74/06 370/311

* cited by examiner

METHOD FOR TRANSMITTING DATA BY USING IMPLICIT FORWARD ORDERING INFORMATION OBTAINED THROUGH COMPETITION BY MEANS OF DISTRIBUTED COORDINATION FUNCTION IN WIRELESS LAN, AND WIRELESS COMMUNICATION DEVICE FOR TRANSMITTING DATA BY USING THE SAME

TECHNICAL FIELD

The present invention relates to a method for transmitting data using a wireless LAN, and more particularly, to a method for transmitting data by using implicit forward ordering information obtained through competition by means of a distributed coordination function (DCF) in a wireless LAN, the method capable of realizing higher throughput than a DCF by applying a specific function to the DCF which is a basic media access control scheme used in the IEEE 802.11 wireless LAN, and a wireless communication device for transmitting data by using the same.

BACKGROUND ART

Recently, the IEEE 802.11 wireless LAN has been widely used for wireless Internet access because the IEEE 802.11 wireless LAN can be installed through a simple method and maintained at a low cost. Currently, the IEEE 802.11 wireless LAN defines two different media access control schemes.

As a basic access scheme, the IEEE 802.11 wireless LAN uses a distributed coordination function (hereafter, referred to as "DCF"). The DCF is a general carrier sense multiple access scheme with collision avoidance (CSMA/CA) which can be used in both of an ad-hoc network and an infrastructured network environment.

Furthermore, the IEEE 802.11 wireless LAN may selectively use a media access control scheme referred to as a polling-based point coordinate function (PCF).

A wireless network has a characteristic of broadcasting. When two stations use a channel having the same band, the two stations cannot transmit data at the same time. When two or more stations transmit data at the same time, a collision may occur. In this case, all of the transmissions may fail.

The conventional DCF includes three inter-frame spaces (IFS), that is, a short inter-frame space (SIFS), a PCF inter-frame space (PIFS), and a DCF inter-frame space (DIFS), in order to implement the IEEE 802.11 media access control scheme.

The IFS indicates a minimum waiting time which is necessarily required before a next frame transmission operation is performed after one frame is transmitted. The three inter-frame spaces have a relationship of SIFS<PIFS<DIFS. Since the SIFS is the shortest, the SIFS is used for a communication having the highest priority.

Hereafter, a general method for stochastically avoiding a collision occurring in a wireless environment using a DCF will be described.

The DCF uses a binary exponential back-off scheme, in order to avoid a collision between transmit (Tx) stations and to prevent a specific station from consecutively occupying a channel. The binary exponential back-off scheme reduces the probability of consecutive collisions by setting a delay time until a transmission is attempted again, when data transmission signals on a transmission medium collide with each other in a wireless LAN.

Before data are transmitted, all stations check whether the transmission medium is occupied by another station. At this time, when the transmission medium is not used during a DIFS, each of the stations considers that the transmission medium is idle, and immediately transmits data. A station receiving the data transmits an ACK frame immediately after an SIFS, the ACK frame indicating that the data was successfully transmitted. The station having succeeded in transmitting data preferentially selects a back-off number as an arbitrary value smaller than a contention window, regardless of whether the station still has data to transmit, and starts back-off.

Since the SIFS is smaller than the DIFS, a transmission of another station does not interfere with a transmission of an ACK frame. When no ACK frame is received, the station considers that the transmission failed, and doubles the value of the contention window. The initial value of the contention window is set to CWmin, and the maximum value of the contention window is set to CWmax. When a transmission is successfully performed, the contention window is reset to CWmin.

When the transmission medium is occupied by another station, that is, when the transmission medium is busy, the corresponding station selects the back-off number to an arbitrary value smaller than the contention window. At this time, when the transmission medium is not used during a DIFS, the station considers that the transmission medium is idle, and starts back-off.

When a transmission of another station is not performed during a predetermined slot time, the station reduces the back-off number one by one. Then, when the back-off number becomes zero, the station transmits data. When a transmission of another station is recognized, the station stops back-off. Then, when the transmission medium becomes idle again during a DIFS, the station resumes back-off.

Then, when the back-off number becomes zero and the transmission medium is idle, the station starts transmission.

Although the conventional DCF was adopted as a basic media access control scheme of the IEEE 802.11 wireless LAN, the conventional DCF exhibits low performance. Furthermore, as the number of stations increases, collisions may frequently occur, and a bandwidth may be wasted by unused back-off slots. Thus, the conventional DCF has a low transmission rate.

In order to solve the above-described problems, a variety of schemes have been proposed. However, in a general competition-based distributed media access control scheme, collisions and unused back-off slots have a trade-off relationship. Thus, when one is intended to be reduced, the other is increased. Therefore, such an access scheme has a limitation in improving performance.

DISCLOSURE

Technical Problem

Accordingly, the present invention has been made in an effort to solve the problems occurring in the related art, and an object of the present invention is to provide a method for transmitting data by using implicit forward ordering information obtained through competition by means of a DCF in a wireless LAN, in order to improve inefficiency of the DCF which is a basic media access control scheme used in the IEEE 802.11 wireless LAN.

Another object of the present invention is to provide a wireless communication device which transmits data through the method for transmitting data by using implicit forward ordering information obtained through competition by means of a DCF in a wireless LAN.

Technical Solution

In order to achieve the above object, according to one aspect of the present invention, there is provided a method for transmitting data by using implicit forward ordering information obtained through competition by means of a DCF in a wireless LAN. The method may include: succeeding, by a first station, in transmitting data through a DCF competition at a first transmission round, when one transmission round is defined as a period from the time at which a station starts to compete after a DCF inter-frame space (DIFS) to the time at which a transmission medium starts being idle during a DIFS for a next DCF competition after one or more data transmissions are successfully performed; succeeding, by a second station, in transmitting data through a DCF competition at a second transmission round, when the second transmission round is defined as a transmission round succeeding the first transmission round; confirming, by the first station, the last station of a sequence performed at the second transmission round as an immediate predecessor, when a transmission channel is empty during a point coordinate function (PCF) inter-frame space (PIFS) at the second transmission round; setting implicit forward ordering information in the first station, wherein the first station acquires a channel use right without a DCF competition after the confirmed immediate predecessor, according to the implicit forward ordering information; and transmitting, by the first station, data without a DCF competition after the confirmed immediate predecessor, according to the implicit forward ordering information.

When a station succeeds in transmitting data through a DCF competition, implicit forward ordering information which is currently set in the station may be released to remove an immediate predecessor, and a station which succeeds in transmitting data through DCF competitions at both of the first and second transmission rounds may be controlled not to confirm an immediate predecessor at the second transmission round. When a station having the implicit forward ordering information set therein confirmed an additional transmission opportunity after data transmission of an immediate predecessor, but failed to transmit data even though the station acquired a channel use right to transmit data, the implicit forward ordering information may be released.

Furthermore, the method may use a short inter-frame space (SIFS), a PIFS, and a DIFS which are defined in the IEEE 802.11 media access control (MAC) standard, the SIFS may indicate a minimum waiting time which is required until a station having the implicit forward ordering information set therein transmits data after the last frame of an immediate predecessor, the PIFS may indicate a minimum time during which the second station needs to wait in a state where a channel is empty, in order to confirm an immediate predecessor, and the DIFS may indicate a time during which stations need to wait in a state where a channel is empty, in order to start a DCF competition.

When RTS/CTS options are activated and used together, a station which succeeds in transmitting data through the RTS/CTS options may be handled in the same manner as a station which succeeds in transmitting data through a DCF competition.

According to another aspect of the present invention, a wireless communication device may include: a competition-based data transmission unit configured to transmit data through a DCF competition at a first transmission round, when one transmission round is defined as a period from the time at which a station starts to compete after a DIFS to the time at which a transmission medium starts being idle during a DIFS for a next DCF competition after a data transmission is successfully performed; a transmission success recognition unit configured to recognize that a second station succeeds in transmitting data through a DCF competition at a second transmission round, when the second transmission round is defined as a transmission round succeeding the first transmission round; an immediate predecessor confirmation unit configured to check whether a transmission channel is empty during a PIFS at the second transmission round, and confirm the last station of a sequence performed at the second transmission round as an immediate predecessor, when the transmission channel is empty; an implicit forward ordering information setting unit configured to set implicit forward ordering information through which a channel use right is given without a DCF competition, when the immediate predecessor succeeds in transmitting data; and a non-competition-based data transmission unit configured to transmit data without a DCF competition after the immediate predecessor, when the implicit forward ordering information is set.

When the station succeeds in transmitting data through DCF competitions at both of the first and second transmission rounds, the immediate predecessor confirmation unit cannot confirm an immediate predecessor.

The wireless communication device may include an implicit forward ordering information release unit configured to remove an immediate predecessor by releasing implicit forward ordering information set in a station, when the station succeeds in transmitting data through a DCF competition. The implicit forward ordering information release unit may release the implicit forward ordering information when the station has no data to transmit even though a channel use right is given to the station without a DCF competition after data transmission of an immediate predecessor, or fails to transmit data even though the station transmitted data using the given channel use right without a DCF competition.

The competition-based data transmission unit, the transmission success recognition unit, the immediate predecessor confirmation unit, and the non-competition-based data transmission unit may use an SIFS, a PIFS, and a DIFS which are defined in the IEEE 802.11 MAC standard, the SIFS may indicate a minimum waiting time which is required until a station having the implicit forward ordering information set therein transmits data after the last frame of an immediate predecessor, the PIFS may indicate a minimum time during which the second station needs to wait in a state where a channel is empty, in order to confirm an immediate predecessor, and the DIFS may indicate a time during which stations need to wait in a state where a channel is empty, in order to start a DCF competition.

When RTS/CTS options are activated and used together, a station which succeeds in transmitting data through the RTS/CTS options may be handled in the same manner as a station which succeeds in transmitting data through a DCF competition.

Advantageous Effects

According to the embodiments of the present invention, the method for transmitting data by using implicit forward ordering information obtained through competition by means of a DCF in a wireless LAN and the wireless communication device for transmitting data by using the same may significantly reduce back-off slots and collisions using the conventional DCF, and realize higher throughput than the DCF.

Furthermore, since implicit forward ordering is distributed and performed in a plurality of stations, an overhead caused by an additional control message may be removed. Furthermore, since a simple function is added to the IEEE 802.11 DCF defined as a standard, it is possible to provide compatibility in which a station can communicate with existing terminals at existing access points (APs) or wireless networks using the IEEE 802.11 DCF.

BRIEF DESCRIPTION OF THE DRAWINGS

The above objects, and other features and advantages of the present invention will become more apparent after a reading of the following detailed description taken in conjunction with the drawings, in which.

BEST MODE FOR THE INVENTION

Reference will now be made in greater detail to a preferred embodiment of the invention, an example of which is illustrated in the accompanying drawings. Wherever possible, the same reference numerals will be used throughout the drawings and the description to refer to the same or like parts.

In embodiments of the present invention, all stations compete with each other through the IEEE 802.11 DCF, in order to transmit data. At this time, all of the stations can receive and recognize transmissions which are being performed, due to the characteristics of the wireless communication. Each of stations staying awake, that is, each of stations which are not set in a power saving mode provided by the IEEE 802.11 to intentionally reduce energy consumption may receive a frame which is being transmitted, and decode the MAC (Medium Access Control) header of the frame, in order to determine whether data which are being transmitted are provided for the station. Then, when a destination described in the header corresponds to the station, the station may receive the entire frame, and pass the frame to an upper layer. Otherwise, the station may discard the frame. As such, the embodiments of the present invention are based on the supposition that all stations can receive transmissions which are being performed.

In order to reduce waste caused by an excessive number of idle slots and collisions and waste caused by competition, each station may determine when to transmit data. For example, a station B may always transmit data after a station A, and a station C may transmit data after the station B. That is, after each station successfully transmits data, another station may reserve a right to occupy a transmission medium.

In the embodiments of the present invention, implicit forward ordering information may be used to make a transmission reservation without an additional overhead, during data transmission. For this operation, the stations may compete to acquire a right to use a transmission medium, using the IEEE 802.11 DCF. During data transmission, only one station may normally transmit data at a specific time, due to the characteristics of wireless communication. That is, the forward order in which the stations attempt to transmit data and succeed in transmitting data may be implicitly recognized.

In the embodiments of the present invention, an implicit forward ordering process for removing an excessive number of idle slots or collisions and reserving a transmission order without any overhead may be defined as a process of confirming an immediate predecessor.

Figure 1:
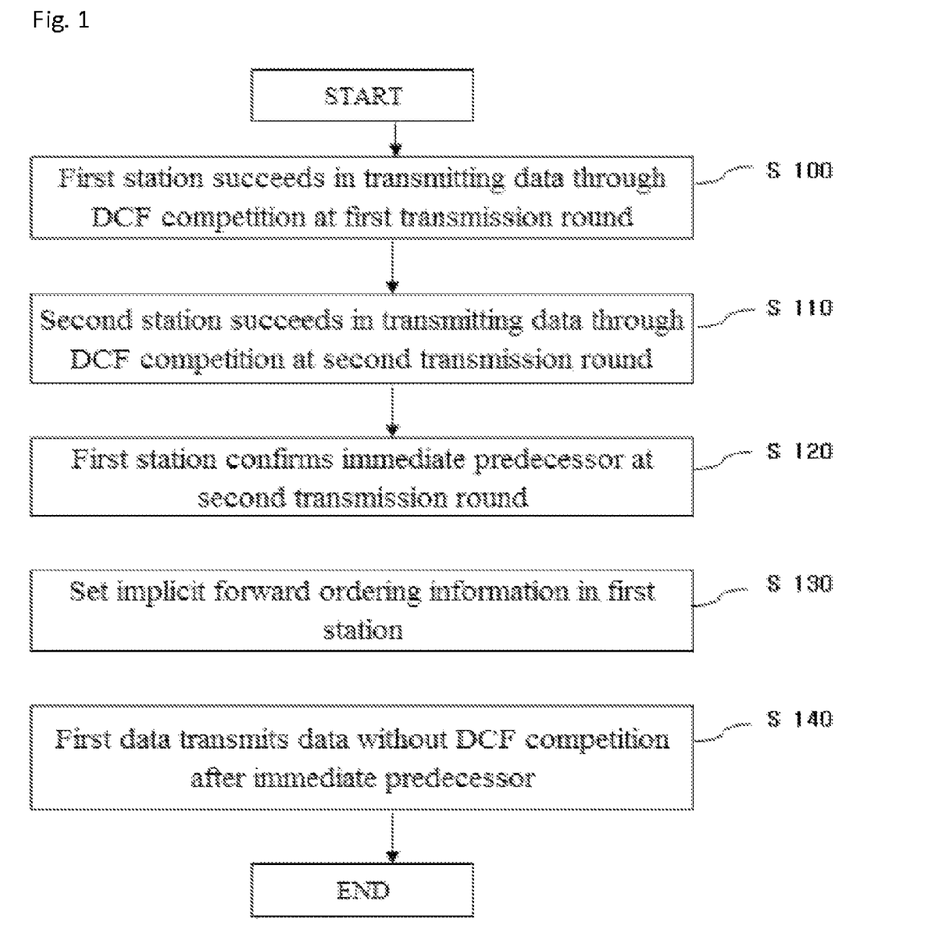
FIG. 1 is a flowchart illustrating a method for transmitting data by using implicit forward ordering information obtained through competition by means of a DCF in a wireless LAN according to an embodiment of the present invention.

FIG. 1 is a flowchart illustrating a method for transmitting data by using implicit forward ordering information obtained through competition by means of a DCF in a wireless LAN according to an embodiment of the present invention.

Figure 2:
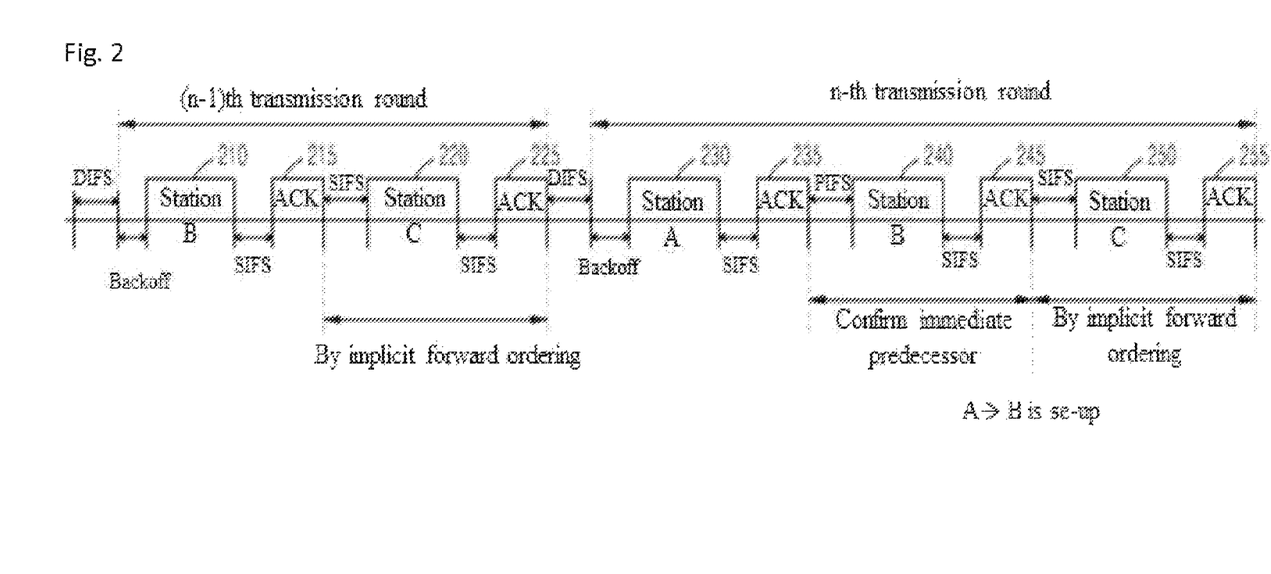
FIG. 2 illustrates an example of a process for acquiring implicit forward ordering information through a DCF competition in a wireless LAN according to the embodiment of the present invention.
Figure 3:
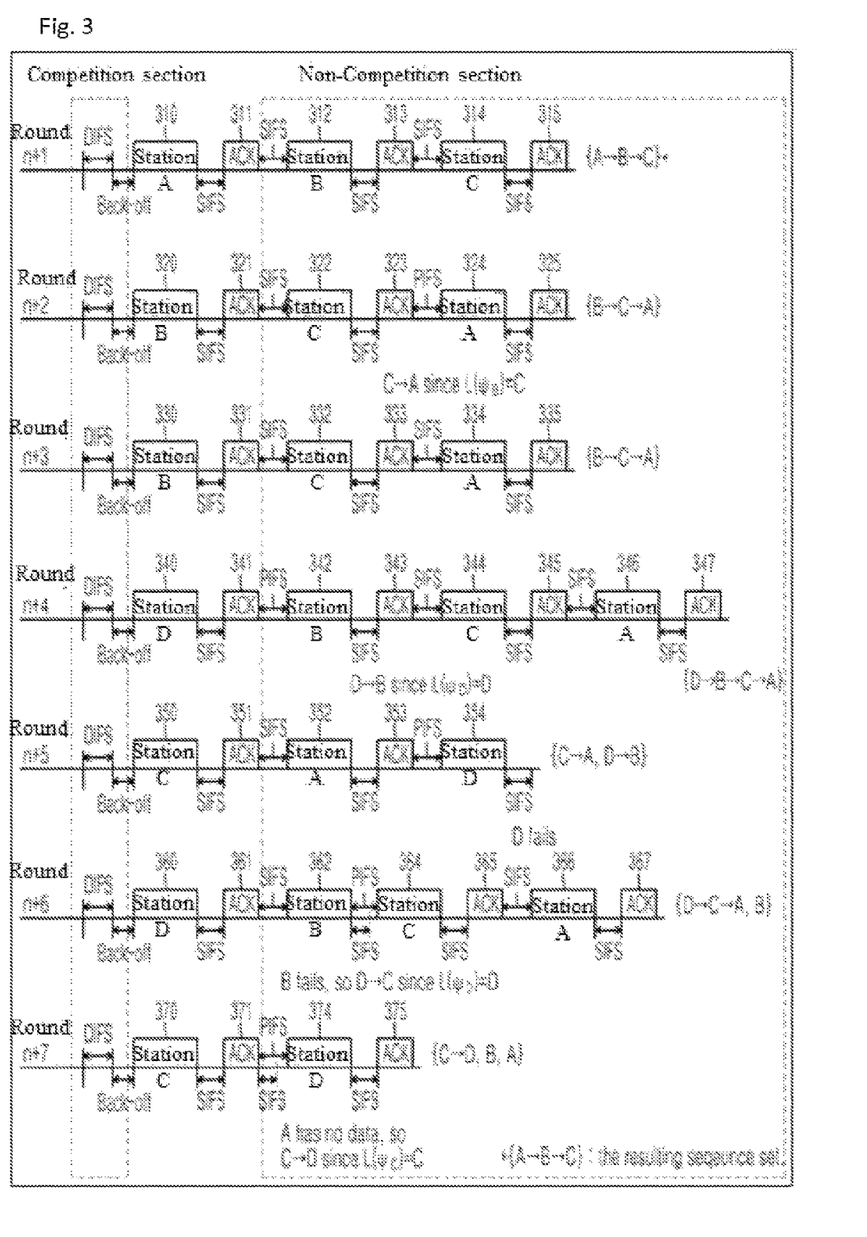
FIG. 3 illustrates an operation example of the method for transmitting data by using implicit forward ordering information obtained through competition by means of a DCF in a wireless LAN according to the embodiment of the present invention.

FIG. 2 illustrates an example of a process for acquiring implicit forward ordering information through a DCF competition in a wireless LAN according to the embodiment of the present invention. FIG. 3 illustrates an operation example of the method for transmitting data by using implicit forward ordering information obtained through competition by means of a DCF in a wireless LAN according to the embodiment of the present invention.

Referring to FIGS. 1 to 3, the method for transmitting data by using implicit forward ordering information obtained through competition by means of a DCF in a wireless LAN according to the embodiment of the present invention will be described.

First, one logical transmission round may be defined as follows. The transmission round may refer to two consecutive DCF inter-frame spaces (DIFSs) including one or more successful transmissions. In FIG. 2, one round may be set to a period from the time at which a station B competes to transmit data after a DIFS before an (n−1)th transmission round to the time at which a transmission medium starts being idle during a DIFS for another competition after the data is successfully transmitted.

At this time, one round may include a plurality of successful transmissions. Furthermore, one round may be defined when one or more transmissions are successfully performed. After one round is successfully defined, one logical sequence S may be recognized. In reality, no stations need to know the logical sequence S. However, the logical sequence may be used for convenience of description. Furthermore, before one round is ended, an ongoing sequence P may exist.

Thus, in the following descriptions, one transmission round may be defined as a period from the time at which a station starts to compete after a DIFS to the time at which the transmission medium starts being idle during a DIFS for the next DCF competition after one or more data transmissions are successfully performed.

First, a first station may succeed in transmitting data through a DCF competition at a first transmission round at step S100. Then, a second station may succeed in transmitting data through a DCF competition at a second transmission round at step S110. The second transmission round may be defined as a transmission round succeeding the first transmission round.

When a transmission channel is empty during a PCF inter-frame space (PIFS) at the second transmission round, the first station may confirm the last station of a sequence which is performed at the second transmission round, as an immediate predecessor, at step S120. Then, implicit forward ordering information through which the first station acquires a right to use the channel (hereafter, referred to as a channel use right) after the confirmed immediate predecessor may be set in the first station at step S130.

Then, the first station which has the implicit forward ordering information set therein, that is, which has the immediate predecessor may transmit data without a DCF competition after the immediate predecessor, at step S140.

The above-described steps S100 to S140 will be described in more detail with reference to FIG. 2.

In FIG. 2, suppose that a station B is the immediate predecessor of a station C before an (n−1)th transmission round. This relation may be expressed as a sequence {B→C}. At this time, a sequence S(B) starting with the station B may be defined as the sequence {B→C}. The station B may acquire a channel use right (210) through a DCF competition, and transmit data. Then, the station B may receive an ACK frame (215) indicating that the data was successfully transmitted. Then, the station C which already has the station B as the immediate predecessor may acquire a channel use right without a competition after an SIFS, and transmit data (220). After an SIFS, the station C may receive an ACK frame (225) indicating that the data was successfully transmitted.

While the transmission round is in progress, the sequence P(B) may be defined as {B→C}. After the transmission round is ended, the sequence P(B) may be updated into the sequence S(B) before an n-th round is started. A function L( ) may indicate the last station of a sequence. That is, an output value of a function L(S(B)) may correspond to the station C.

After the (n−1)th transmission round is ended, the channel may be idle during a DIFS. Then, the station A may transmit data (230) through a DCF competition at the n-th transmission round, and receive an ACK frame (235) indicating that the data was successfully transmitted.

At this time, the station B (210) which is a winner of the DCF competition at the previous transmission round, that is, the (n−1)th transmission round may have a right to confirm the immediate predecessor thereof at the n-th transmission round. The station B may confirm a result value of a function L(P(A)) as the immediate predecessor thereof, using the function L(P(A)). This rule may be referred to as an implicit forward ordering (IO) rule.

When the transmission channel is continuously empty during a PIFS, the station B which is a winner of the previous transmission round, that is, the (n−1)th transmission round may acquire a channel use right and transmit data (240). Then, when receiving an ACK frame (245) indicating that the data was successfully transmitted, the station B may set the station A to the immediate predecessor. When the immediate predecessor is set in such a manner, that is, when implicit forward ordering information is set, the station B may have an additional transmission opportunity without a competition according to the implicit forward ordering information, in case where the station A succeeds in transmitting data afterwards. When the station B succeeds in transmitting data according to the implicit forward ordering information, the station C (250) having the station B as the immediate predecessor based on the implicit forward ordering information may transmit data without a competition, and receive an ACK frame (255) indicating that the data was successfully transmitted.

At this time, such a series of processes do not require any additional functions and any additional control messages.

When a station succeeds in transmitting data through a DCF competition, the set implicit forward ordering information may be released. Furthermore, a station succeeding in transmitting data through DCF competitions at both of the first and second transmission rounds may be controlled not to confirm the immediate predecessor at the second transmission round. Furthermore, when the station having the implicit forward ordering information set therein confirms an additional transmission opportunity after the immediate predecessor transmits data, the implicit forward ordering information may be release in case where the station has no data to transmit or fails to transmit data even though the station acquired a channel use right and transmitted data.

In other words, the IO-release rule through which the set implicit forward ordering information is released may be defined as follows. According to a first IO-release rule, when a station succeeds in transmitting data through a DCF competition, existing implicit forward ordering information set in the station may be released. Then, when a station succeeds in transmitting data through DCF competitions at consecutive rounds, for example, at an n-th transmission round and an (n+1)th transmission round, the corresponding station has no right to confirm the immediate predecessor thereof at the (n+1)th transmission round. This IO-release rule may prevent a situation in which one loop is formed so that other stations existing in the corresponding sequence cannot access the transmission medium.

According to a second TR-release rule, when a station having the immediate predecessor based on implicit forward ordering information confirms an additional transmission opportunity, the implicit forward ordering information set in the corresponding station may be released in case where the station has no data to transmit or a transmission based on the implicit forward ordering information fails due to the channel state or various other reasons. This is in order to prevent a situation in which one immediate predecessor is redundantly set.

The method according to the embodiment of the present invention may use an SIFS, a PIFS, and a DIFS, which are defined in the IEEE 802.11 MAC standard. The SIFS may be used as a time interval when a transmission is attempted through implicit forward ordering, the PIFS may be used as a time interval when an immediate predecessor is confirmed, and the DIFS may be used as a time interval when a transmission is attempted through a DCF competition.

That is, the SIFS may indicate a minimum waiting time which is required until a station having implicit forward ordering information set therein transmits data after the last frame of an immediate predecessor. The PIFS may indicate a minimum time during which the second station needs to wait in a state where the channel is empty, in order to confirm an immediate predecessor. The DIFS may indicate a time during which stations need to wait in a state where the channel is empty, in order to start a DCF competition.

Referring to FIG. 2, an example in which the SIFS, PIFS, and DIFS are used will be described. At the (n−1)th transmission round, the station C (220) may start transmission through implicit forward ordering at an SIFS after the station B succeeds in transmitting data, that is, after the station B receives an ACK frame (215). Furthermore, at the n-th transmission round, the station B (240) which is a winner of the previous transmission round may confirm the station A (230) as an immediate predecessor at a PIFS after the station A receives an ACK frame (235) indicating that data was successfully transmitted.

As the immediate predecessor is confirmed after the PIFS, a collision may be avoided. Specifically, when an immediate successor of the station A attempts to transmit data through implicit forward ordering, the immediate successor may avoid a collision with the station B. That is, when the immediate successor of the station A exists, the transmission medium may become busy at an SIFS after the station A succeeds in transmitting data, and the station B may confirm this state through carrier sensing. As a result, when the transmission medium is not idle after the PIFS, the station B may determine that the sequence starting with the station A was not yet ended.

FIG. 3 illustrates such a series of processes, that is, an operation example of the method for transmitting data by using implicit forward ordering information obtained through competition by means of a DCF in a wireless LAN according to the embodiment of the present invention.

First, an (n+1)th transmission round will be described. At a competition section of the (n+1)th transmission round, a station A (310) may acquire a channel use right through a DCF competition, and transmit data. Then, the station A may receive an ACK frame (311) after an SIFS, the ACK frame indicating that the data was successfully transmitted. At the (n+1)th transmission round, suppose that a station B has the station A as an immediate predecessor and a station C has the station B as an immediate predecessor. In this case, when a successful transmission of the station A is monitored while the predecessor is monitored, the station B may transmit data without a DCF competition after an SIFS, and receive an ACK frame (313) after an SIFS, the ACK frame indicating that the data was successfully transmitted. Through a similar process, the station C (314) may monitor the immediate predecessor. Thus, when a successful transmission of the immediate predecessor is monitored, the station C may transmit data without a DCF competition after an SIFS, and receive an ACK frame (315) indicating that the data was successfully transmitted. This sequence may be expressed as a sequence {A→B→C}.

Next, an (n+2)th transmission round will be described. At a competition section of the (n+2)th transmission round, the station B (320) may acquire a channel use right through a DCF competition, and transmit data. Then, the station B may receive an ACK frame (321) indicating that the data was successfully transmitted. Then, the station B may release the existing implicit forward ordering information according to the above-described first IO-release rule, that is, because the station B succeeded in transmitting data through a DCF competition. Since the station C has the station B as an immediate predecessor at the (n+1)th transmission round, the station C (322) may transmit data without a DCF competition after an SIFS, and receive an ACK frame (323) indicating that the data was successfully transmitted. Then, when the transmission medium is empty even during a PIFS after the SIFS, the station A (310, 324) which is a winner of the DCF competition at the previous transmission round, that is, the (n+1)th transmission round may confirm the station C (322) which is the last station of the ongoing sequence, as the immediate predecessor, and transmit data. Then, the station A may receive an ACK frame (325) indicating that the data was successfully transmitted. As such, the implicit forward ordering information through which the channel can be used without a DCF competition may be expressed as a sequence {B→C→A}.

Next, an (n+3)th transmission round will be described. The station B (330) may consecutively acquire a channel use right through a DCF competition after the (n+2)th transmission round, and transmit data. Then, the station B may receive an ACK frame (331) indicating that the data was successfully transmitted. Since the station C has the station B as an immediate predecessor at the (n+1)th transmission round, the station C (332) may transmit data without a DCF competition at a non-competition section, and receive an ACK frame (333) indicating that the data was successfully transmitted. Furthermore, according to the set implicit forward ordering information, the station A has the station C as the immediate predecessor at the (n+2)th transmission round. Thus, at the non-competition section, the station A (334) may transmit data without a DCF competition, and receive an ACK frame (335) indicating that the data was successfully transmitted. The implicit forward ordering information may be expressed as a sequence {B→C→A}.

At the (n+3)th transmission round, however, the first IO-release rule may be applied, because the station B transmitted the data by consecutively acquiring a channel use right through a DCF competition after the (n+2)th transmission round and received the ACK frame (331) indicating that the data was successfully transmitted. That is, since the station B succeeded in transmitting data through DCF competitions at the (n+2)th and (n+3)th transmission rounds which are consecutive transmission rounds, the station B has no right to confirm an immediate predecessor at the (n+3)th transmission round. In this way, it is possible to prevent a situation in which other stations which do not existing in the corresponding sequence cannot access the transmission medium.

Next, an (n+4)th transmission round will be described. At the (n+4)th transmission round, a station D (340) corresponding to a new station which is not included in the sequences formed at the above-described transmission rounds may acquire a channel use right through a DCF competition, and transmit data. Then, the station D may receive an ACK frame (341) after an SIFS, the ACK frame indicating that the data was successfully transmitted. Then, when the transmission medium is empty even during a PIFS after the SIFS, the station B (330, 342) which is a winner of the DCF competition at the previous transmission round, that is, the (n+3)th transmission round may confirm the station D (340) which is the last station of the ongoing sequence, as an immediate predecessor. In this case, implicit forward ordering information in which the station B has the station D as the immediate predecessor may be set in the station B (342). This implicit forward ordering information may be expressed as a sequence {D→B}. Then, when the station B (342) transmits data and receives an ACK frame (343) indicating a successful transmission, the station C (344) having the station B as an immediate predecessor may transmit data without a DCF competition according to the set implicit forward ordering information, and receive an ACK frame (345). Similarly, the station A having the station C as an immediate predecessor may transmit data without a competition, according to the implicit forward ordering information set at the (n+2)th transmission round, and receive an ACK frame (347) indicating that the data was successfully transmitted. Thus, at the (n+4)th transmission round, the sequence starting with the station D may be updated into a sequence {D→B→C→A}.

Next, an (n+5)th transmission round will be described. At a competition section of the (n+5)th transmission round, the station C (350) may acquire a channel use right through a DCF competition, and transmit data. Then, the station C may receive an ACK frame (351) indicating that the data was successfully transmitted. Then, the existing implicit forward ordering information set in the station C may be released according to the above-described first IO-release rule, that is, because the station C succeeded in transmitting data through a DCF competition. According to the implicit forward ordering information set at the (n+2)th transmission round, the station A having the station C as an immediate predecessor may transmit data without a competition after an SIFS, and receive an ACK frame (353) indicating that the data was successfully transmitted. Then, when the transmission medium is empty even during a PIFS after the SIFS, the station D (340, 354) which is a winner of the DCF competition at the previous transmission round, that is, the (n+4)th transmission round may confirm the station A (352) which is the last station of the ongoing sequence, as an immediate predecessor. Thus, a sequence {D→A} may be set. However, since the station D (354) failed to transmit data because the station D did not receive an ACK frame after an SIFS, the set implicit forward ordering information {D→A} may be released according to the above-described second IO-release rule. Thus, the sequence of the station C may be updated into a sequence {C→A}, and the sequence of the station D may be updated into a sequence {D→B}. As a result, at the (n+5)th transmission round, the sequence {C→A, D→B} may be set.

Next, an (n+6)th transmission round will be described. The station D (360) may acquire a channel use right through a DCF competition, and transmit data. Then, the station D may receive an ACK frame (361) indicating that the data was successfully transmitted. The station B (362) having the station D as an immediate predecessor transmits data after an SIFS, but fails to transmit the data because the station B does not receive an ACK frame after an SIFS. Thus, the station B needs to release the set implicit forward ordering information according to the second IO-release rule. As the sequence {D→B} corresponding to the currently-set implicit forward ordering information is released, the station B does not have the station D as an immediate predecessor.

Then, the station C (364) which is a winner of the DCF competition at the (n+5)th round may monitor that the channel is empty during a PIFS. In this case, the station C may recognize the station D (360) having succeeded in transmitting data as an immediate predecessor, and transmit data. Then, the station C may receive an ACK frame (365) after an SIFS, the ACK frame indicating that the data was successfully transmitted. The station A (366) having the station C as an immediate predecessor may transmit data without a DCF competition, and receive an ACK frame (367) indicating that the data was successfully transmitted. As a result, at the (n+6)th transmission round, a sequence {D→C→A, B} may be set.

Next, an (n+7)th transmission round will be described. The station C (370) may acquire a channel use right through a DCF competition, and transmit data. Then, the station C may receive an ACK frame (371) indicating that the data was successfully transmitted. However, since the station A having the station C as an immediate predecessor has no data to transmit, the station D which is a winner of the DCF competition at the (n+6)th transmission round may confirm the station C (370) as an immediate predecessor after a PIFS. Then, as the currently-set implicit forward ordering information is released, the station A does not have an immediate predecessor. As a result, at the (n+7)th transmission round, a sequence {C→D, B, A} may be set.

In the embodiments of the present invention, RTS/CTS options may be used together without any problems. According to the IEEE 802.11 standard, the use of RTS/CTS options may be recommended as one of methods for solving a hidden station problem. When the RTS/CTS options used together, a station which succeeds in transmitting data through the RTS/CTS options may be handled in the same manner as a station which succeeds in transmitting data through a DCF competition. That is, when the RTS/CTS options are activated and used together, a station which succeeds in transmitting data through the RTS/CTS options may be handled in the same manner as a station which succeeds in transmitting data through a DCF competition.

Figure 4:
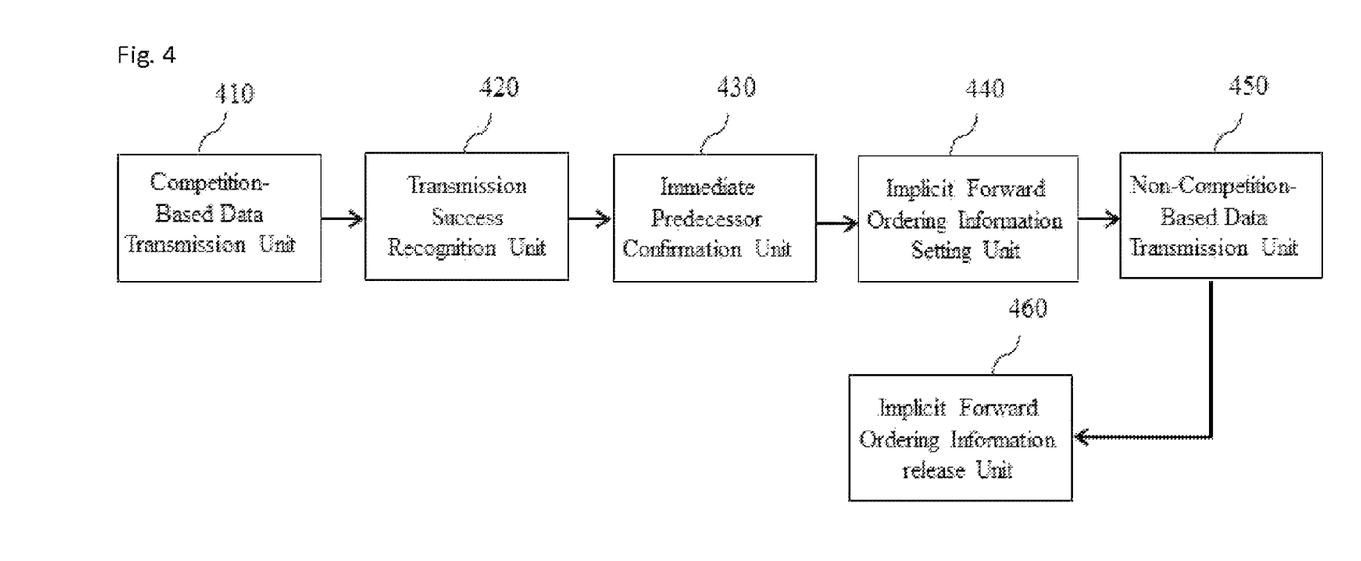
FIG. 4 illustrates an example of a wireless communication device which transmits data through the method for transmitting data by using implicit forward ordering information obtained through competition by means by a DCF in a wireless LAN according to the embodiment of the present invention.

FIG. 4 illustrates an example of a wireless communication device which transmits data through the method for transmitting data by using implicit forward ordering information obtained through competition by means by a DCF in a wireless LAN according to the embodiment of the present invention.

The wireless communication device according to the embodiment of the present invention may include a competition-based data transmission unit 410, a transmission success recognition unit 420, an immediate predecessor confirmation unit 430, and an implicit forward ordering information setting unit 440, and a non-competition-based data transmission unit 450. The wireless communication device may further include an implicit forward ordering information release unit 460.

The competition-based data transmission unit 410 may transmit data through a DCF competition at a first transmission round. At this time, one transmission round may be defined as a period from the time at which a station starts to compete after a DIFS to the time at which a transmission medium starts being idle during a DIFS for the next DCF competition after a data transmission is successfully performed.

The transmission success recognition unit 420 may recognize that a second station succeeds in transmitting data through a DCF competition at a second transmission round, when the second transmission round is set to a transmission round succeeding the first transmission round.

The immediate predecessor confirmation unit 430 may check whether a transmission channel (transmission medium) is empty during a PIFS at the second transmission round. When the transmission channel is empty, the immediate predecessor confirmation unit 430 may confirm the last station of a sequence performed at the second transmission round as an immediate predecessor thereof. However, when the station successfully transmits data through DCF competitions at both of the first and second transmission rounds, the immediate predecessor confirmation unit 30 may be controlled not to confirm the immediate predecessor at the second transmission round. This may correspond to the first IO-release rule of the IO-release rules through which implicit forward ordering information is released. According to the IO-release rule, when a station succeeds in transmitting data through DCF competitions at consecutive transmission rounds, that is, an n-th transmission round and an (n+1)th transmission round, the station may be controlled to lose a right to confirm the immediate predecessor thereof at the (n+1)th transmission round. Thus, it is possible to prevent a situation in which one loop is formed so that other stations existing in the corresponding sequence cannot access the transmission medium.

The implicit forward ordering information setting unit 440 may set implicit forward ordering information through which a channel use right is given without a DCF competition, when the immediate predecessor succeeds in transmitting data.

The non-competition-based data transmission unit 450 may transmit data after the immediate predecessor without a DCF competition, when the implicit forward ordering information is set.

The implicit forward ordering information release unit 460 may release the implicit forward ordering information, when the station has no data to transmit even though a channel use right was given to the station without a DCF competition after the immediate predecessor transmitted data or fails to transmit data even though the station transmitted the data using the given channel use right without a DCF competition. This may correspond to the second IO-release rule of the IO-release rules through which implicit forward ordering information is released. When a station having an immediate predecessor based on the implicit forward ordering information confirms an additional transmission opportunity, the implicit forward ordering information set in the station may be released in case where the station has no data to transmit or a transmission based on the implicit forward ordering information fails due to the channel state or various other reasons. This is in order to prevent a situation in which one immediate predecessor is redundantly set.

The competition-based data transmission unit 410, the transmission success recognition unit 420, the immediate predecessor confirmation unit 430, and the non-competition-based data transmission unit 450 may use the SIFS, PIFS, and DIFS which are defined in the IEEE 802.11 MAC standard. At this time, the SIFS may indicate a minimum waiting time which is required until a station having implicit forward ordering information set therein transmits data after the last frame of an immediate predecessor. The PIFS may indicate a minimum time during which the second station needs to wait in a state where a channel is empty, in order to confirm an immediate predecessor. The DIFS may indicate a time during which stations need to wait in a state where a channel is empty, in order to start a DCF competition. Furthermore, when RTS/CTS options are activated and used together, a station which succeeds in transmitting data through the RTS/CTS options may be handled in the same manner as a station which succeeds in transmitting data through a DCF competition.

The present invention can also be embodied as computer readable codes on a computer readable recording medium. The computer readable recording medium may include any data storage devices for storing data which can be thereafter read by a computer system. Examples of the computer readable recording medium include read-only memory (ROM), random-access memory (RAM), CD-ROMs, magnetic tapes, floppy disks, and optical data storage devices.

Although a preferred embodiment of the present invention has been described for illustrative purposes, those skilled in the art will appreciate that various modifications, additions and substitutions are possible, without departing from the scope and the spirit of the invention as disclosed in the accompanying claims.

The invention claimed is:

1. A method for transmitting data by using implicit forward ordering information obtained through competition by means of a distributed coordination function (DCF) in a wireless LAN, comprising:
   succeeding, by a first station, in transmitting data through a DCF competition at a first transmission round, when one transmission round is defined as a period from the time at which a station starts to compete after a DCF inter-frame space (DIFS) to the time at which a transmission medium starts being idle during a DIFS for a next DCF competition after one or more data transmissions are successfully performed;
   succeeding, by a second station, in transmitting data through a DCF competition at a second transmission round, when the second transmission round is defined as a transmission round succeeding the first transmission round;
   confirming, by the first station, the last station of a sequence performed at the second transmission round as an immediate predecessor, when a transmission channel is empty during a point coordinate function (PCF) inter-frame space (PIFS) at the second transmission round;
   setting implicit forward ordering information in the first station, wherein the first station acquires a channel use right without a DCF competition after the confirmed immediate predecessor, according to the implicit forward ordering information; and
   transmitting, by the first station, data without a DCF competition after the confirmed immediate predecessor, according to the implicit forward ordering information.

2. The method of claim 1, wherein when a station succeeds in transmitting data through a DCF competition, implicit forward ordering information which is currently set in the station is released to remove an immediate predecessor.

3. The method of claim 1, wherein a station which succeeds in transmitting data through DCF competitions at both of the first and second transmission rounds is controlled not to confirm an immediate predecessor at the second transmission round.

4. The method of claim 1, wherein when a station having the implicit forward ordering information set therein has no data to transmit in case where the station confirms an additional transmission opportunity after data transmission of an immediate predecessor, the implicit forward ordering information is released.

5. The method of claim 1, wherein when a station having the implicit forward ordering information set therein confirmed an additional transmission opportunity after data transmission of an immediate predecessor, but failed to transmit data even though the station acquired a channel use right to transmit data, the implicit forward ordering information is released.

6. The method of claim 1, wherein the method uses a short inter-frame space (SIFS), a PIFS, and a DIFS which are defined in the IEEE 802.11 media access control (MAC) standard,
   the SIFS indicates a minimum waiting time which is required until a station having the implicit forward ordering information set therein transmits data after the last frame of an immediate predecessor,
   the PIFS indicates a minimum time during which the second station needs to wait in a state where a channel is empty, in order to confirm an immediate predecessor, and
   the DIFS indicates a time during which stations need to wait in a state where a channel is empty, in order to start a DCF competition.

7. The method of claim 1, wherein when RTS/CTS options are activated and used together, a station which succeeds in transmitting data through the RTS/CTS options is handled in the same manner as a station which succeeds in transmitting data through a DCF competition.

8. A wireless communication device comprising:
   a competition-based data transmission unit configured to transmit data through a DCF competition at a first transmission round, when one transmission round is defined as a period from the time at which a station starts to compete after a DIFS to the time at which a transmission medium starts being idle during a DIFS for a next DCF competition after a data transmission is successfully performed;
   a transmission success recognition unit configured to recognize that a second station succeeds in transmitting data through a DCF competition at a second transmission round, when the second transmission round is defined as a transmission round succeeding the first transmission round;
   an immediate predecessor confirmation unit configured to check whether a transmission channel is empty during a PIFS at the second transmission round, and confirm the last station of a sequence performed at the second transmission round as an immediate predecessor, when the transmission channel is empty;

an implicit forward ordering information setting unit configured to set implicit forward ordering information through which a channel use right is given without a DCF competition, when the immediate predecessor succeeds in transmitting data; and a non-competition-based data transmission unit configured to transmit data without a DCF competition after the immediate predecessor, when the implicit forward ordering information is set.

9. The wireless communication device of claim 8, wherein when the station succeeds in transmitting data through DCF competitions at both of the first and second transmission rounds, the immediate predecessor confirmation unit cannot confirm an immediate predecessor.

10. The wireless communication device of claim 8, further comprising an implicit forward ordering information release unit configured to remove an immediate predecessor by releasing implicit forward ordering information set in a station, when the station succeeds in transmitting data through a DCF competition.

11. The wireless communication device of claim 10, wherein the implicit forward ordering information release unit releases the implicit forward ordering information when the station has no data to transmit even though a channel use right is given to the station without a DCF competition after data transmission of an immediate predecessor, or fails to transmit data even though the station transmitted data using the given channel use right without a DCF competition.

12. The wireless communication device of claim 8, wherein the competition-based data transmission unit, the transmission success recognition unit, the immediate predecessor confirmation unit, and the non-competition-based data transmission unit use an SIFS, a PIFS, and a DIFS which are defined in the IEEE 802.11 MAC standard, the SIFS indicates a minimum waiting time which is required until a station having the implicit forward ordering information set therein transmits data after the last frame of an immediate predecessor, the PIFS indicates a minimum time during which the second station needs to wait in a state where a channel is empty, in order to confirm an immediate predecessor, and the DIFS indicates a time during which stations need to wait in a state where a channel is empty, in order to start a DCF competition.

13. The wireless communication device of claim 8, wherein when RTS/CTS options are activated and used together, a station which succeeds in transmitting data through the RTS/CTS options is handled in the same manner as a station which succeeds in transmitting data through a DCF competition.

* * * * *